3,794,641
SUBSTITUTED PHTHALIMIDO-1,3,5-TRIAZINES

Katalin Görög, nee Privitzer and Györgyi Bruckner, Budapest, Béla Ráskay, Veszprem, and Kálmán Farkas, Erzsébet Grega, nee Toth, Sándor Marosvölgyi, Zoltan Pintér, and Gyula Szilágyi, Miskole, Hungary, assignors to Nehezvegyipari Kutato Intezet, Veszprem, and Eszakmagyarorszagi, Vegyimuvek, Sajobabony, Hungary
No Drawing. Filed Dec. 14, 1970, Ser. No. 98,026
Int. Cl. C07d 55/20
U.S. Cl. 260—249.8      2 Claims

ABSTRACT OF THE DISCLOSURE

This invention relates to new, substituted phthalimido-1,3,5-triazines, as well as to a process for the preparation thereof. The new compounds according to the invention correspond to 2-phthalimido-4X,6Y-1,3,5-triazines, wherein X and Y each represent chlorine, lower alkoxy, lower alkylthio, lower alkylamino or phthalimido groups. The new compounds have herbicide activity.

---

This invention relates to new, substituted phthalimido-1,3,5-triazine derivatives, as well as to a process for the preparation thereof. The new compounds according to the invention correspond to the Formula I

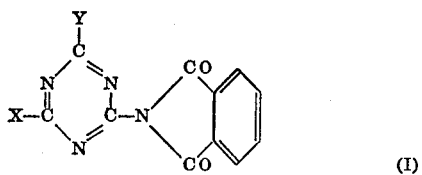

(I)

wherein X and Y each represent chlorine atom or C 1–4 alkoxy, C 1–4 alkylthio, C 1–4 alkylamino group or phthalimido group.

There were already known some substituted amino-1,3,5-triazine derivatives having herbicide activity. The Belgian Pats. Nos. 620,373, 620,430, 620,431, 620,374 and French Pats. Nos. 1,329,307 and 1,343,955 describe some monocarboxylic acid compounds of different alkylamino derivatives, as well as their use as herbicide agents.

The East German patent specification No. 36,295 (Enrico Knüeli et al.) describes the plant growth regulating effect of some monocarboxylic acid-alkylamino-triazine derivatives.

British Pat. No. 1,030,751 (Pfeiffer, R. E.) reports the use of the 2-methoxy-3,6-dichlorobenzoic acid salts of 2,4-bis-alkylamino - 6 - methylmercapto-symm.triazine derivatives as herbicide agents.

Although the literature reports numerous triazine-monocarboxylic acid derivatives as shown hereinbefore, they have not been used in the practice, accordingly their herbicide activity is insufficient.

There were never been described 1,3,5-triazine derivatives carrying one or more phthalimido radical on their nuclear carbon atoms. Now we have found that such novel triazine derivatives possess very marked and selective herbicide activity.

The biological activity of the compounds of the invention has been determined on MV corn hybride at a 25 m.$^2$ parcel of land. Each of the experiments has been repeated four times. The parcel has been sprayed with a solution or suspension of the active agent two days after sowing. The values which characterize the biological activity of the compounds of the invention have been evaluated after 5 months, at the final bonitation, and the harvest results have been determined on the day after corn shaping. The results are summarized in Table 1.

TABLE 1

| Compound | Concentration of the active agent added, kg./ha. | Selectivity, percent | Weed density, percent | Harvest result, kg./25 m.$^2$ |
|---|---|---|---|---|
| 2-ethylamino-4-phthalimido-6-chloro-symm.triazine | 3 | 100 | 3 | 15.00 |
| Do | 5 | 100 | 0 | 16.60 |
| 2-ethylamino-4-isopropylamino-6-chloro-symm.triazine (known) | 3 | 100 | 6 | 14.00 |
| Do | 5 | 100 | 0 | 14.80 |
| 2-ethylamino-4-isopropylamino-6-chloro-symm.triazine plus 2-ethylamino-4-isoporpylamino-6-methylmercapto-symm.triazine plus 2,4-dichloro-phenoxy-acetic acid sodium salt (known) | 7 | 100 | 0 | 12.10 |
| Control (covered with weeds) | | | 100 | 8.10 |

The above data indicate, that the new substituted phthalimido-triazine derivatives of the Formula I possess selective phythotoxic activity, and can be used with good results for combatting weeds, further they can be used as active ingredients of herbicide compositions. The 2-ethylamino-4-phthalimido-6-chloro - symm.triazine prepared according to the invention destroys weeds completely already in a very low concentration, and does not damage the corn at all. Accordingly, the harvest results are higher on the areas treated with 2-ethylamino-4-phthalimido-6-chloro-symm.triazine than that obtained when 2-ethylamino-4-isopropylamino-6-chloro-symm.triazine (which proved to be the best herbicide agent in the practical use) is used.

The compounds of the Formula I are prepared according to the invention by replacing one, two or all the three chlorine atoms of cyanurchloride by one phthalimido group and if desired by one or two radicals selected from the group consisting of phthalimido, C 1–4 alkoxy, C 1–4 alkylthio and C 1–4 alkylamino radicals.

The replacement of the chlorine atoms is carried out in the following sequence of steps:

In the first step cyanurchloride is reacted with phthalimide or phthalimide-alkali metal, preferably with phthalimide potassium. In this reaction 2-phthalimido-4,6-dichloro-1,3,5 - triazine, 2,4-bis-phthalimido-6-chloro-1,3,5-triazine or 2,4,6-tri-phthalimido-1,3,5-triazine is obtained, depending on the molar ratio of the reactants.

Thereafter an alkylamino group is attached to the molecule if desired. Phthalimido-chlorotriazine derivative is reacted with an alkylamine in the presence of an acid binding agent to yield phthalimido-alkylamino-triazine derivative.

Finally the third chlorine atom is also replaced, if desired.

The alkoxy group can be introduced into the phthalimido-triazine derivatives with an alkali metal alcoholate. Where an alkylthio derivative is wanted, this group can be introduced into the molecule with alkali metal-alkylmercaptides or by reacting the starting substance with thiourea and thereafter alkylating the obtained thiuronium salt.

The chlorine atoms of the cyanurchloride are replaced under the following reaction circumstances: if the first chlorine atom is replaced, the acetone or benzene solution of cyanurchloride is reacted with stoichiometric amount of a reagent capable to the introduction of phthalimido group at a temperature below 0° C., preferably at −5 to −20° C.

If the second chlorine atom is also to be replaced, the product obtained in the above reaction is dissolved in an indifferent solvent, e.g. in acetone and reacted with stoichiometric amount of phthalimide potassium or a C 1–4 alkyl amine. The reagents can also be used in an excess of about 20 percent. The reaction is carried out at room temperature, and the reaction is completed with heating, if necessary. If the third chlorine atom is also to be replaced, the product obtained in this latter reaction is suspended in an indifferent organic solvent, e.g. in methanol, a C 1–4 alkoxy-amine or C 1–4 alkylthio reagent is added to the suspension, and the mixture is refluxed. The alkoxy- or alkylthio reagent is used in stoichiometric amount or in an excess of about 30 percent.

If the first and second chlorine atoms of cyanurchloride are both replaced, this can be effected without isolation of the product obtained in the first step. The product obtained in the second step, which contains one chlorine atom in the molecule separates from the solution. The product is isolated—except when all the three chlorine atoms are replaced by phthalimido groups—suspended in an indifferent organic solvent, e.g. in methanol, and reacted with the third reagent.

The process of the invention is elucidated in more details in the following, non-limiting examples.

EXAMPLE 1

2-phthalimido-4,6-dichloro-1,3,5-triazine 18.5 g. (0.1 mole) of phthalimide potassium are added within 30 minutes to a solution of 18.4 g. (0.1 mole) of cyanurchloride in 150 ml. of acetone at −5 to −10° C. with stirring. The reaction mixture is stirred for additional 2 hours at −10° C., then it is poured into 500 ml. of ice water. The separated product is collected by filtration, washed chloride-free with water and dried. 25.0 g. of white, crystalline 2-phthalimido - 4,6 - dichloro-1,3,5-triazine are obtained, M.P.: 178–180° C. Yield 84.7%. Chlorine content: Calculated: 24.07%. Found: 23.42%.

EXAMPLE 2

2,4-bis-phthalimido-6-chloro-1,3,5-triazine 18.5 g. (0.1 mole) of phthalimide potassium are added within 30 minutes to a solution of 18.4 g. (0.1 mole) of cyanurchloride in 150 ml. of acetone at −5 to −10° C. with stirring. The reaction mixture is stirred for additional 2 hours, then it is allowed to warm to room temperature and 18.5 g. (0.1 mole) of phthalimide potassium are added with stirring. The reaction mixture is boiled for one hour, then it is cooled and poured into ice water. The separated product is collected by filtration, washed chloride-free with water and dried. 36.9 g. of white, crystalline 2,4-bis-phthalimido-6-chloro-1,3,5-triazine are obtained, M.P.: >240° C. Yield: 91.2%. Chlorine content: Calculated: 8.64%. Found: 8.6%.

EXAMPLE 3

2,4,6-tris-phthalimido-1,3,5-triazine 61.0 g. (0.33 mole) of phthalimide potassium are added in small portions within 30 minutes to a solution of 18.4 g. (0.1 mole) of cyanurchloride in 500 ml. of acetone. The reaction mixture is boiled for 8 hours with stirring, then it is cooled and poured into 2 l. of ice water. The separated product is collected by filtration, washed chloride-free with water and dried. 41.7 g. of white, crystalline 2,4,6-tris-phthalimido-1,3,5-triazine are obtained. The product does not melt up to 300° C. Yield: 80.1%. Nitrogen content: Calculated: 16.28%. Found: 16.0%.

EXAMPLE 4

2-ethylamino-4-phthalimido-6-chloro-1,3,5-triazine 29.5 g. (0.1 mole) of 2-phthalimido-4,6-chloro-1,3,5-triazine are suspended in 160 ml. of acetone, and an aqueous solution of 9.0 g. (0.2 mole) of ethylamine is added to the suspension at 20 to 25° C. with stirring. The reaction mixture is boiled for one hour, then it is cooled and poured into 1 l. of ice water. The separated white product is collected by filtration, washed chloride-free with water and dried. 17.0 g. of crystalline 2-ethylamino-4-phthalimido-6-chloro-1,3,5-triazine are obtained, M.P.: 100–105° C. Yield: 48%.

EXAMPLE 5

2-ethylamino-4-phthalimido-6-methylthio-1,3,5-triazine 9.1 g. (0.12 mole) of thiourea are added to a suspension of 34.9 g. (0.1 mole) of 2-ethylamino-4-phthalimido-6-chloro-1,3,5-triazine in 160 ml. of methanol. The reaction mixture is refluxed for 3 hours with stirring, then a 50% aqueous solution of 8.0 g. (0.2 mole) of sodium hydroxide is added dropwise. The mixture is boiled for 1 hour, then 13.9 g. (0.11 mole) of dimethylsulfate are added dropwise, and the mixture is boiled for additional one hour. The reaction mixture is cooled, poured into 400 ml. of ice water and the separated product is collected by filtration. 25.6 g. white, crystalline 2-ethylamino-4 - phthalimido - 6-methylthio-1,3,5-triazine are obtained, M.P.: 145–150° C. Yield: 71.2%. Sulphur content: Calculated: 8.87%. Found: 8.3%.

EXAMPLE 6

2-ethylamino-4-phthalimido-6-methylthio-1,3,5-triazine

An aqueous solution of sodium methylmercaptane [prepared by reacting 7.2 g. (0.15 mole) of methylmercaptan and a 10% aqueous solution of 6.0 g. (0.15 mole) of sodium hydroxide] is added dropwise to the suspension of 34.9 g. (0.1 mole) of 2-ethylamino-4-phthalimido-6-chloro-1,3,5-triazine in 160 ml. of methanol. The reaction mixture is refluxed for 5 hours. Thereafter ⅔rd of the solvent is distilled off, the residue is cooled and poured into ice water. The separated product is collected by filtration, washed chloride-free with water and dried. While, crystalline 2 - ethylamino - 4 - phthalimido - 6 -, methylthio-1,3,5-triazine is obtained, M.P.: 148–150° C. Yield: 75.2%. Sulphur content: Calculated: 8.87%. Found: 8.4%.

EXAMPLE 7

2,4-bis-phthalimido-6-methylthio-1,3,5-triazine 40.5 g. (0.1 mole) of 2,4-bis-phthalimido-6-chloro-1,3,5-triazine are suspended in 160 ml. of methanol and 9.1 g. (0.12 mole) of thiourea are added to the suspension. The reaction mixture is boiled for 3 hours with stirring then it is cooled to 50° C. and a 50% aqueous solution of 8.0 g. (0.2 mole) of sodium hydroxide are added dropwise. The reaction mixture is boiled for 1 hour, and then 13.9 g. (0.11 mole) of dimethylsulfate are added. The mixture is boiled for additional one hour, then it is cooled and poured into 400 ml. of ice water. The separated product is collected by filtration, washed chloride- and sulfate-free with water and dried. 33.2 g. of white, crystalline 2,4 - bis - phthalimido - 6 - methylthio-1,3,5-triazine are obtained, M.P.: 170–175° C. Yield: 80.0%. Sulphur content: Calculated: 7.69%. Found: 7.0%.

EXAMPLE 8

2,4-bis-phthalimido-6-methoxy-1,3,5-triazine 2.3 g. (0.1 mole) of metallic sodium are added in portions to 160 ml. of methanol, and the mixture is boiled for 15 minutes. Thereafter 40.5 g. (0.1 mole) of 2.4-bis-phthalimido-6-chloro-1,3,5-triazine are added to the obtained sodium methylate solution. The reaction mixture is boiled for 30 minutes then it is cooled and poured into 1500 ml. of water. The separated product is collected by filtration, washed chloride-free with water and dried. 28.5 g. of white, powdery 2,4-bis-phthalimido - 6 - methoxy-1,3,5-triazine are obtained, M.P.: 125–130° C. Yield: 70.2%. Nitrogen content: Calculated: 17.50%. Found: 17.15%.

What we claim is:
1. A substituted phthalimido-1,3,5-triazine derivative of the Formula I

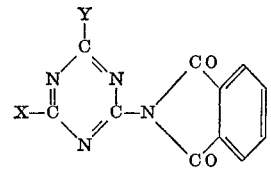

wherein X and Y each represent chlorine, C 1–4 alkoxy, C 1–4 alkylthio, C 1–4 alkylamino or phthalimido radicals.

2. 2-ethylamino-4-phthalimido-6-chloro-1,3,5-triazine.

References Cited
UNITED STATES PATENTS

| | | | |
|---|---|---|---|
| 3,202,681 | 8/1965 | Dexter et al. | 260—249.8 X |
| 3,310,557 | 3/1967 | Kleemann | 260—249.8 X |
| 3,417,079 | 12/1968 | Randall et al. | 260—249.8 X |

JOHN M. FORD, Primary Examiner

U.S. Cl. X.R.

260—249.5, 249.6; 71—93